US012163371B2

(12) United States Patent
Narvaez et al.

(10) Patent No.: US 12,163,371 B2
(45) Date of Patent: Dec. 10, 2024

(54) TELESCOPING DOOR WITH SWING CLEAR BREAKOUT HINGE

(71) Applicant: Overhead Door Corporation, Lewisville, TX (US)

(72) Inventors: Leonel Narvaez, Corpus Christi, TX (US); Federico Romero, Corpus Christi, TX (US)

(73) Assignee: Overhead Door Corporation, Lewisville, TX (US)

( * ) Notice: Subject to any disclaimer, the term of this patent is extended or adjusted under 35 U.S.C. 154(b) by 0 days.

(21) Appl. No.: 17/872,903

(22) Filed: Jul. 25, 2022

(65) Prior Publication Data

US 2022/0356749 A1 Nov. 10, 2022

Related U.S. Application Data

(63) Continuation of application No. 16/372,102, filed on Apr. 1, 2019, now Pat. No. 11,396,770, which is a (Continued)

(51) Int. Cl.
*E05D 7/02* (2006.01)
*E05D 15/06* (2006.01)
(Continued)

(52) U.S. Cl.
CPC .......... *E06B 3/509* (2013.01); *E05D 15/0604* (2013.01); *E05D 15/08* (2013.01);
(Continued)

(58) Field of Classification Search
CPC ........ E06B 3/509; E06B 3/5072; E06B 3/922; E05D 15/0604; E05D 15/08; E05D 15/58;
(Continued)

(56) References Cited

U.S. PATENT DOCUMENTS 552,879 A * 1/1896 Muchmore ............... E06B 3/50 49/257
2,833,346 A * 5/1958 Preston ................... E06B 3/922 160/197
(Continued)

FOREIGN PATENT DOCUMENTS

EP 2093362 A1 * 8/2009 ........... E05D 5/0223
GB 2025499 A 1/1980
KR 20160143083 A * 12/2016

OTHER PUBLICATIONS

Horton Automatics, Architectural Details, Manual slide Doors—ICU/CCU, Jan. 2009, 1 page.

*Primary Examiner* — Jerry E Redman
(74) *Attorney, Agent, or Firm* — Haynes and Boone, LLP

(57) ABSTRACT

A door system includes a track spanning a doorway defined by a trailing jamb and an opposing lead jamb, a sidelite panel coupled to the trailing jamb by a swing clear hinge, and first and second slide panels moveable within the track. The trailing jamb includes a jamb face facing in a first direction. The swing clear hinge includes a fixed portion engaged with a revolving portion. The fixed portion is offset from the jamb face in a second direction and secured by a jamb attachment member to the jamb face. The first and second slide panels have an open configuration in the track with the revolving portion offset from the jamb face in the second direction. The panels are configured to pivot out of the track into a breakout configuration. The sidelite panel is offset from the jamb face in the second direction in the breakout configuration.

20 Claims, 17 Drawing Sheets

Related U.S. Application Data continuation-in-part of application No. 16/172,315, filed on Oct. 26, 2018, now Pat. No. 10,851,569.

(60) Provisional application No. 62/694,884, filed on Jul. 6, 2018.

(51) Int. Cl.

| | |
|---|---|
| ***E05D 15/08*** | (2006.01) |
| ***E05D 15/58*** | (2006.01) |
| ***E06B 3/50*** | (2006.01) |
| *E05D 3/12* | (2006.01) |

(52) U.S. Cl.
CPC .............. *E05D 15/58* (2013.01); *E05D 3/122* (2013.01); *E05Y 2900/132* (2013.01)

(58) Field of Classification Search
CPC .............. E05D 3/122; E05D 2015/485; E05Y 2900/132; E05F 2017/007
USPC ............................................... 49/399; 16/354
See application file for complete search history.

(56) References Cited

U.S. PATENT DOCUMENTS 3,092,870 A 6/1963 Baer
3,374,499 A * 3/1968 Horstman ............... E05D 3/122 16/354
3,402,422 A 9/1968 Baer
3,422,488 A * 1/1969 Horstman ................. E05D 1/04 160/231.1
4,438,594 A * 3/1984 Bunzl ....................... E06B 3/50 49/411
4,619,074 A * 10/1986 Leung ..................... E05D 15/58 49/165
4,761,853 A * 8/1988 Hoffman ................... E05F 1/12 16/302
4,785,485 A 11/1988 Etesam
4,999,880 A * 3/1991 Baer ......................... E05D 1/04 16/354
5,575,114 A 11/1996 Riegelman
5,749,172 A 5/1998 Isopahkala
5,832,980 A * 11/1998 Cianciolo ............... E05D 15/58 160/197
6,068,041 A * 5/2000 Miles .................... E04B 2/7425 160/211
6,170,195 B1 * 1/2001 Lim ........................ E05D 15/58 49/141
6,170,210 B1 * 1/2001 Marts ...................... E06B 5/164 52/656.2
6,735,823 B2 * 5/2004 Pelletier .................. E05D 3/122 16/382
7,260,916 B2 8/2007 Sarnell et al.
7,406,748 B2 * 8/2008 Baer ....................... E05D 3/022 16/382
7,451,802 B2 * 11/2008 Cianciolo ............... E05D 15/58 160/225
7,458,410 B1 * 12/2008 Bronner .............. E05D 15/0656 160/214
8,096,342 B2 * 1/2012 Scruggs .................. E05D 15/08 160/218
8,381,443 B2 * 2/2013 Smith ..................... E05D 15/48 49/141
8,443,549 B2 * 5/2013 Salvietti ................ E05F 15/646 49/141
8,756,864 B2 * 6/2014 Hamaker ................ E05D 15/48 49/168
8,993,898 B2 * 3/2015 Weibler ............... A61B 5/0046 49/164
9,187,930 B2 * 11/2015 Mayer ...................... E04B 2/827
9,290,974 B2 * 3/2016 Alexander .............. E05D 3/122
9,376,849 B2 * 6/2016 Lim ........................ E06B 3/481
10,280,678 B1 5/2019 Rendon, Jr.
10,337,228 B1 * 7/2019 Matthews ............. E06B 3/5072
10,407,960 B2 * 9/2019 Wolfe ................. E05B 65/0085
10,472,872 B2 11/2019 Ingram
10,851,569 B2 12/2020 Narvaez
11,396,770 B2 * 7/2022 Romero .................. E05D 15/58
2007/0169899 A1 * 7/2007 Cianciolo ............... E05D 15/58 160/211
2010/0024160 A1 * 2/2010 Kuchas ................... E05F 1/025 16/81
2012/0159851 A1 6/2012 Seymour
2015/0361697 A1 * 12/2015 Krause ...................... E06B 3/70 49/399
2016/0251885 A1 9/2016 Conley
2022/0356749 A1 * 11/2022 Narvaez .................. E05D 15/08

* cited by examiner

TELESCOPING DOOR WITH SWING CLEAR BREAKOUT HINGE

PRIORITY CLAIM

This application is a continuation of U.S. patent application Ser. No. 16/372,102 (now U.S. Pat. No. 11,396,770), filed Apr. 1, 2019, which is a Continuation-in-part application of and claims priority to U.S. patent application Ser. No. 16/172,315 (now U.S. Pat. No. 10,851,569), filed on Oct. 26, 2018, and entitled "Telescoping Door with Swing Clear Breakout Hinge," which claims priority to U.S. Provisional Application No. 62/694,884, filed on Jul. 6, 2018, and entitled "Hinge System and Method for Breakout Door," all of which are incorporated herein by reference in their entirety.

BACKGROUND

Technical Field

The present invention relates generally to sliding door systems, and more particularly to a telescoping door with a swing clear hinge to facilitate breakout functionality.

Description of Related Art

Sliding door systems are used as entryways and exits to intensive care units ("ICU") and critical care units in hospitals. In particular, patient rooms in these units are equipped with large manual sliding doors. The doors are often glass to allow medical professionals a view of the patients that need round-the-clock monitoring. Because stretchers, wheelchairs, and other medical equipment are frequently moved in and out of the ICU, sliding doors are often employed. In addition, an intensive care unit has certain environmental standards that should be maintained to ensure a healthy environment for patient recovery. For example, in certain ICUs, the sliding doors do not have tracks. For example, many intensive care units have sliding doors that are supported without a bottom track that is fixed to the floor. In these types of doors, the upper track provides the primary support and guides the linear motion of the door as it slides to open and close.

Another concern with sliding doors is that they have the ability to breakout. That is, they should have the ability to rotate off the track, so that a pushing force will cause the door to swing open. The terms "breakout," "breakaway," and "swingout" refer to the ability of the door to be opened by rotating the panels of the door off of the track, as opposed to the normal sliding motion of the panels. This feature may be employed in an emergency and should be able to be accomplished without requiring detailed knowledge of the workings of the door or specific steps that must be followed to allow emergency egress through a telescoping sliding door that has been broken away.

SUMMARY

A telescoping door system includes a header that spans across a doorway. A trailing jamb and a lead jamb disposed a clear opening distance from the trailing jamb defines a clear opening of the doorway. A sidelite panel is coupled to the trailing jamb by at least one swing clear hinge. A slow slide panel and a fast slide panel move linearly within the header. The slow and fast slide panels are configured to create a first-sized opening when positioned in the header.

The sidelite panel, the slow slide panel, and the fast slide panel are configured to pivot out of the header in a breakout position such that a trailing rail of the sidelite panel is disposed at least partially outside the clear opening and in front of the trailing jamb.

The swing clear hinge of the telescoping door system allows the pivot axes of the slow and fast slide panels to be positioned closer to the trailing door jamb than in conventional telescoping door systems, which allows for a larger slide opening. Also, the swing clear hinge allows for a larger pivot opening than in conventional telescoping door systems when the sidelite and the slide panel or panels are pivoted out of the header in a breakout position.

Another embodiment may include a guide pin support system. The guide pin support system may include: a first support plate; a second support plate pivotally attached to the first support plate; a first guide pin supported by the first support plate; a second guide pin supported by the second support plate and the second guide pin pivotable with respect to the first guide pin.

Another embodiment may include a guide pin support system including: a door system having a first panel, a second panel, and a third panel; a second panel track mounted to a bottom of the second panel; a third panel track mounted to a bottom of the third panel; a guide pin support system attached to the second panel, the guide pin support system having two guide pins, both configured to slide in the third panel track wherein one of the guide pins in the guide pin support assembly is configured to move in a pivoting motion with respect to the other guide pin in the second support assembly.

Still other embodiments have a guide pin support system including: a door system having a first panel, a second panel, and a third panel; a second panel track mounted to a bottom of the second panel; a third panel track mounted to a bottom of the third panel; a first guide pin support system attached to the first panel, the first guide pin support system having a first guide pin configured to slide in the second panel track; a second guide pin support system attached to the second panel, the second guide pin support system having two guide pins, both configured to slide in the third panel track wherein one of the guide pins in the second guide pin support assembly is configured to move in a pivoting motion with respect to the other guide pin in the second support assembly.

Other technical advantages will be readily apparent to one of ordinary skill in the art from the following figures, descriptions, and claims. Moreover, while specific advantages have been described above, various embodiments may include all, some, or none of the enumerated advantages.

BRIEF DESCRIPTION OF THE DRAWINGS

A more complete understanding of the present invention may be acquired by reference to the following Detailed Description when taken in conjunction with the accompanying Drawings wherein.

DETAILED DESCRIPTION OF THE DRAWINGS

FIGS. 1, 2A, 2B, and 4 are various views of a telescoping door system 10 with a swing clear breakout hinge 12 that allows the panels of the door system 10 to be broken out to create a large opening through which oversized equipment, furniture, and the like may fit through. According to the teachings of the present disclosure, the sizes of the slide opening and the breakout opening are increased over conventional telescoping door systems (FIGS. 3A and 3B) by using the swing clear breakout hinge 12 (also referred to herein as the swing clear hinge 12). The swing clear hinge 12 enables the larger openings, as discussed in further detail below.

Figure 1:
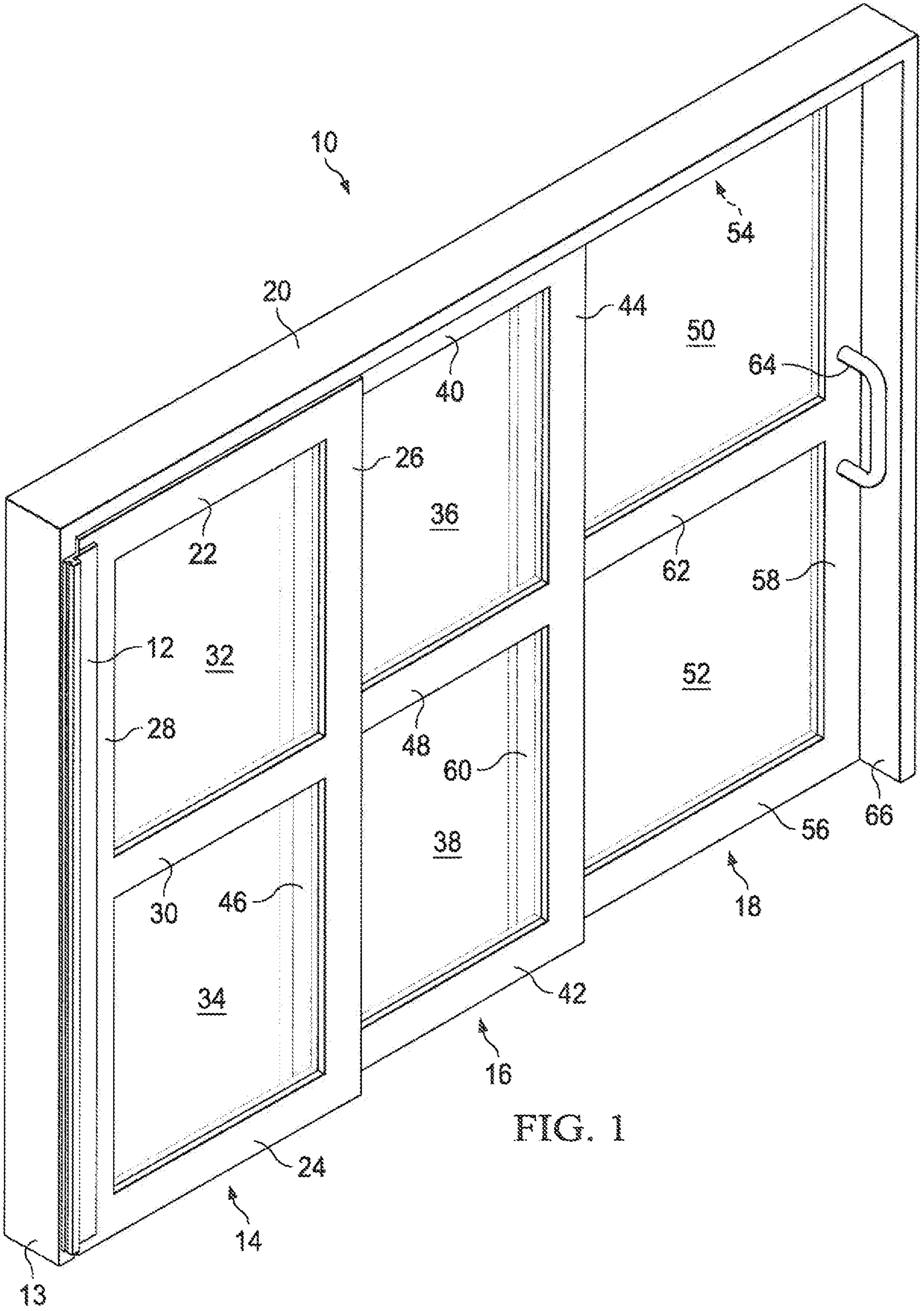
FIG. 1 shows a perspective view of a telescoping door system employing a swing clear hinge according to an embodiment of the present disclosure.

FIG. 1 is a perspective view of the telescoping door system 10. The telescoping door system 10 includes a sidelite panel 14, a slow slide panel 16, and a fast slide panel 18. The sidelite panel 14 is coupled to the trailing door jamb for pivotal movement, but it does not move linearly. The slide panels 16, 18 are known in the art as the "SX," and the sidelite 14 is known as the "SO." The slow slide panel 16 is immediately coupled to the sidelite 14, and the fast slide panel 18 is immediately coupled to and leads the slow slide panel 16. The slide panels 16, 18 and the sidelite panel 14 are supported by a header 20. The header 20 includes the track that guides the linear motion of the slide panels 16, 18 of the telescoping door system 10. According to certain embodiments, the header 20 may be nylon covered aluminum. The slide panels 16, 18 move linearly with respect to the sidelite 14 in a telescoping manner with the fast slide panel 18 leading and controlling the linear movement of the slow slide panel 16. The bottom of the slow slide panel 16 is also guided by a track that is generally located on the underside of the sidelite 14. The bottom of the fast slide panel 18 is guided by a track formed in a bottom rail 42 of the slow slide panel 16. According to certain embodiments, a pin portion of a pin assembly is received in a track disposed in an underside of the bottom rail of each of the slow slide panel 16 and the fast slide panel 18. The tracks constrain the motion of the respective pins and therefore guide the linear motion of each of the slide panels 16, 18 with respect to the other slide panels.

The telescoping door system 10 may include a floor mounted track that helps to guide the linear motion of the slide panels 16, 18, or according to some embodiments, the floor mounted track may be omitted. In certain healthcare facilities, such as an intensive care unit in a hospital, it may be undesirable to have a floor track.

The sidelite 14 includes a top rail 22, a bottom rail 24, a lead rail 26, a trailing rail 28, and a mid-rail 30. An upper pane of glass 32 is framed by a portion of the lead rail 26, the trailing rail 28, the top rail 22, and the mid-rail 30. A lower pane of glass 34 is framed by portions of the lead rail 26, the trailing rail 28, the bottom rail 24, and the mid-rail 30. The slow slide panel 16 similarly includes upper and lower glass panes 36, 38 framed by a top rail 40, a bottom rail 42, a lead rail 44, a trailing rail 46, and a mid-rail 48. The fast slide panel 18 also includes upper glass pane 50 and lower glass pane 52 framed by an upper rail 54, a bottom rail 56, a lead rail 58, a trailing rail 60, and a mid-rail 62. The rails may be made of any suitable material. However, in certain embodiments a light weight material, such as aluminum may be used for the various rails of the door system 10. According to an alternate embodiment, each panel may have only one glass pane or more than two glass panes.

A user moves the telescoping door system 10 from a fully open position to a fully closed position by manually applying a force to a handle 64 disposed on the lead rail 58 of the fast slide panel 18 to displace the fast slide panel 18 toward a lead jamb 66. The fast slide panel 18 is linearly displaced a certain distance, and it catches the slow slide panel 16 and displaces it toward the lead jamb 66 until the fast slide panel 18 reaches the lead jamb 66. The fast slide panel 18 may be positively latched to maintain the door system 10 in the fully closed position. To move the telescoping door system 10 from the fully closed position to the fully open position, the reverse occurs when the user applies the force to the fast slide panel 18 to linearly displace it toward the trailing jamb 13 (also referred to herein as a pivot jamb), and after the fast slide panel 18 is linearly displaced a certain distance, it catches the trailing end 17 of the slow slide panel 16 and displaces it toward the trailing jamb 13. Alternatively, the linear motion of the slide panels 16, 18 may be driven by an operator for automatic sliding movement of the panels 16, 18.

The telescoping door system 10 may also be one half of dual telescoping door system 10 where a second multi-panel telescoping door is disposed opposite the telescoping door system 10 such that a fully closed position has the two telescoping door systems 10 meeting each other in a center of the door frame or opening.

The teachings of the present disclosure are not limited to a three-panel telescoping door system, but rather may be also be employed with a dual-panel slide/swing door system or a door system employing more than three panels.

Figure 2A:
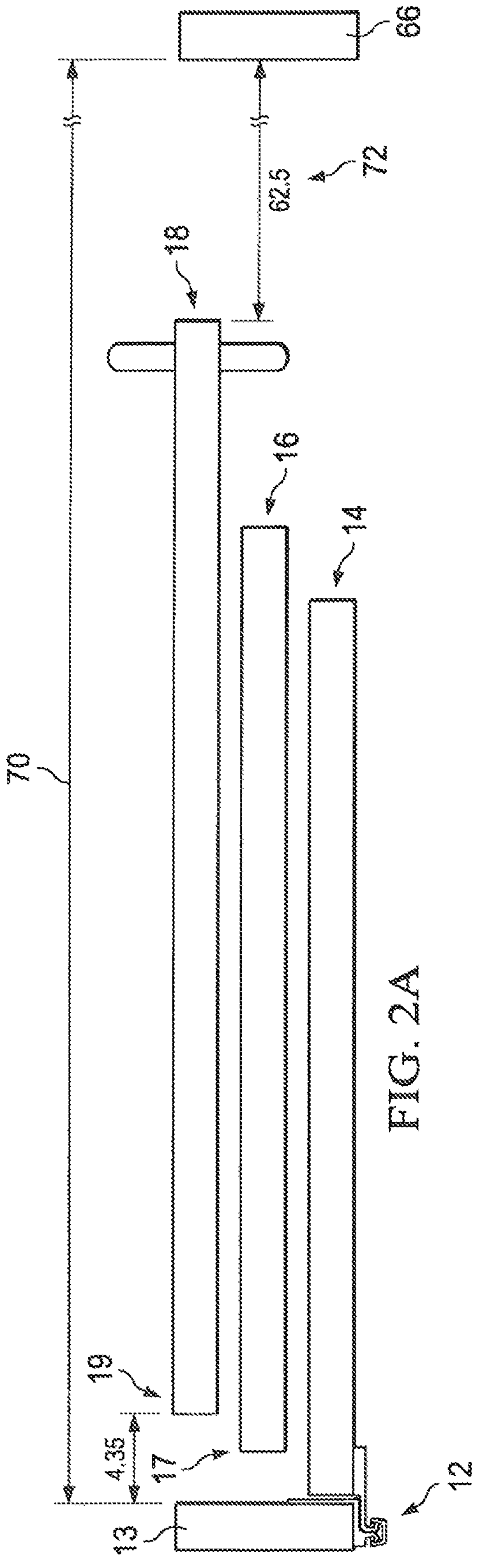
FIG. 2A is a schematic illustration of a top plan view of the telescoping door system with a swing clear hinge shown in FIG. 1 in a fully slid open configuration.

FIG. 2A is a schematic of a top, plan view of the telescoping door system 10 illustrating the distances of the various panels with respect to the door jambs to illustrate the fully open position of the telescoping door system 10. The area between the lead jamb 66 and the trailing jamb 13 is referred to as the clear opening 70. According to one embodiment, the distance of the clear opening 70 may be 100-120 inches, for example 108 inches. Each of the door panels 14, 16, 18 is disposed in the clear opening 70, and a portion of the clear opening 70 defines the slide opening 72 and the breakout opening 74 (also referred to as a pivot opening or a swing opening) (see FIG. 2B). The slide opening 72 is present when the slide panels 16, 18 are fully slid open linearly. That is, the slow slide panel 16 and the fast slide panel 18 are each positioned linearly closest to the trailing jamb 13.

Figure 2B:
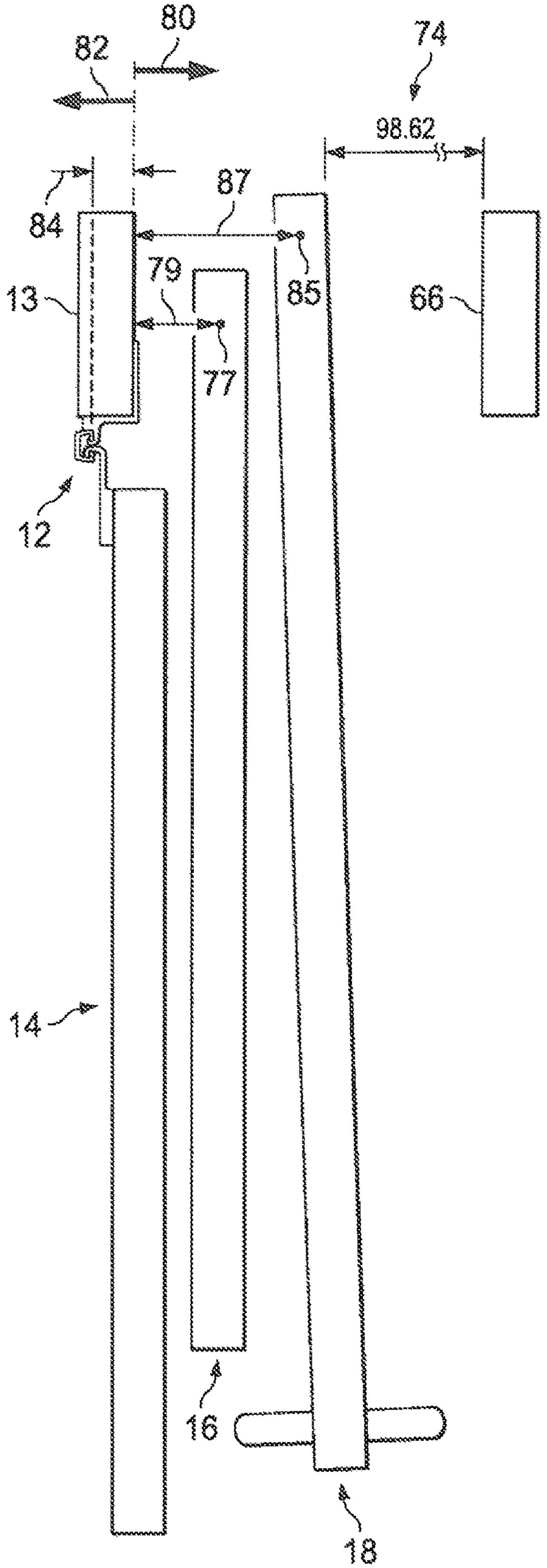
FIG. 2B is a schematic illustration of a top plan view of the telescoping door system with a swing clear hinge shown in FIG. 1 in a breakout configuration.
Figure 2C:
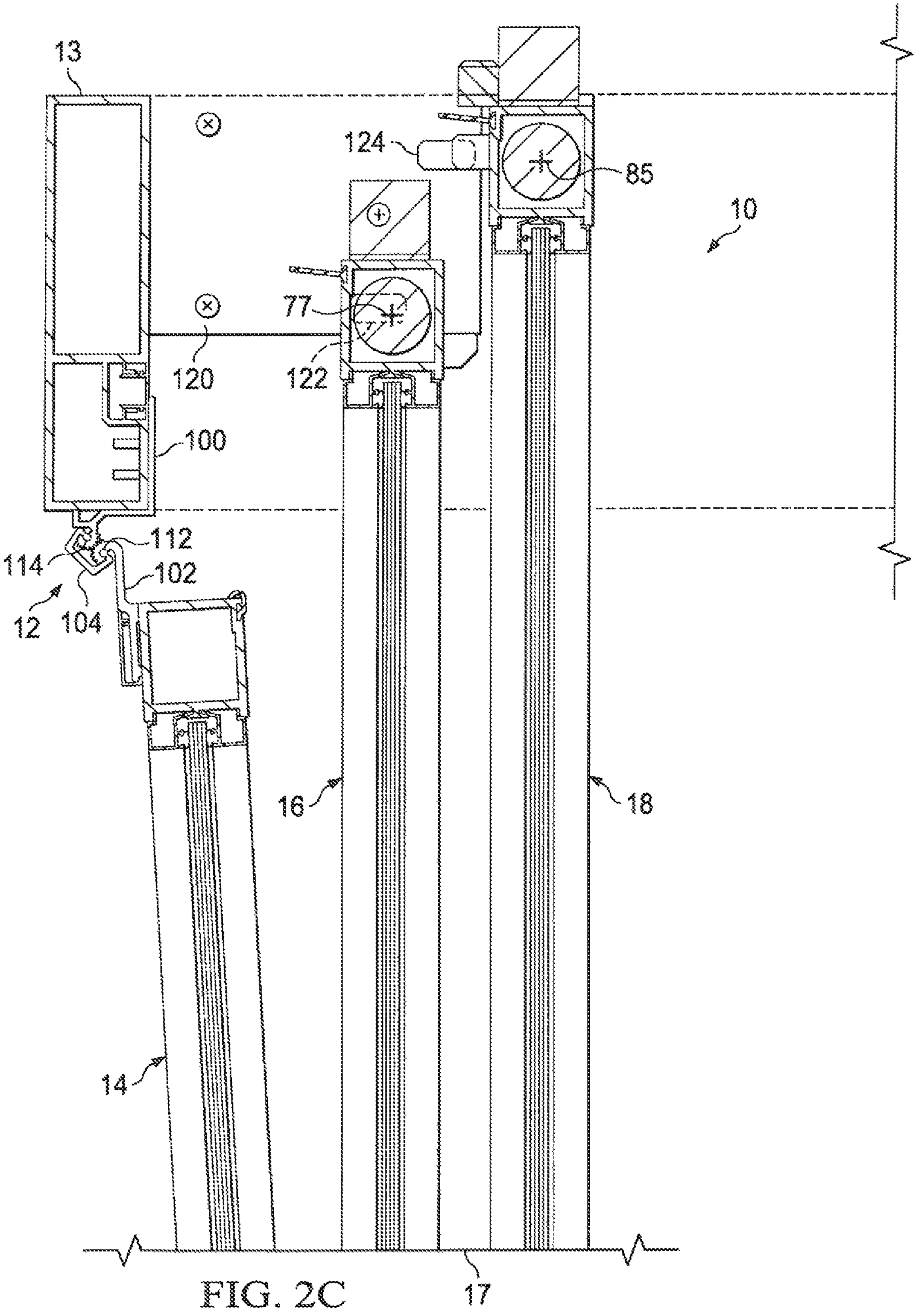
FIG. 2C is a detailed view of a pivot end of the telescoping door system with a swing clear hinge shown in FIG. 1 in a breakout configuration.

FIG. 2B illustrates the breakout opening 74, and FIG. 2C is a detailed view of the pivot end of the door system 10 with the sidelite panel 14, the slow slide panel 16 and the fast slide panel 18 shown in the breakout position. The pivot motion of the sidelite panel 14 is facilitated by the swing clear hinge 12. The breakout opening 74 illustrated in FIG. 2B is created when each of the slide panels 16, 18 are positioned closest to the trailing jamb 13 and each of the slide panels 16, 18 and the sidelite 14 are pivoted so the panels 14, 16, 18 are rotated approximately ninety degrees toward the sidelite side of the clear opening 70. According to some embodiments, a pivot base plate 120 is positioned adjacent the trailing jamb 13. A slow slide panel guide pin 122 extends vertically from the pivot base plate 120, and a fast slide panel guide pin 124 also extends from pivot base plate 120 and is disposed proximate the slow slide panel guide pin 124. When the door system is positioned in its fully slid opened position, the slow slide guide pin 122 facilitates a pivot motion of the slow slide panel 16 with respect to pivot axis 77 to the breakout position, and the fast slide panel guide pin 124 facilitates a pivot motion of the fast slide panel 18 with respect to its pivot axis 85 to its breakout position.

In this breakout position, the panels cannot be linearly moved with respect to each other to close the slide opening 72. The breakout opening 74 is significantly larger than the slide opening 72. In a hospital, the slide opening 72 is used for ingress and egress of typical foot traffic, but if a bed or other large equipment needs to be moved through the door system 10, the panels 14, 16, 18 may be pivoted to create the larger breakout opening 74.

According to some embodiments, the sidelite panel 14 includes a latch assembly that enable deployment and retraction of flush bolt. The flush bolt is retracted from the header to allow the sidelite panel 14 to pivot out of the door frame. A biasing member, such as a spring, may bias the flush bolt toward its extended and locked position.

In pivoting the panels 14, 16, 18 to form the breakout opening 74, each panel 14, 16, 18 pivots on its own pivot axis. Each pivot axis allows the other adjacent panels to pivot approximately 90 degrees without the panels interfering with each other.

It should be understood that the slide open limit of the slow slide panel 16 is associated with its pivot axis. So, when the slow slide panel 16 is slid open such that its trailing end 17 is positioned closest to the trailing jamb 13, the slow slide panel 16 is in position to allow it to pivot to its breakout position without interfering with the pivot motion of the sidelite 14. The same is true for the fast slide panel 18. When the fast slide panel 18 is in its fully open position such that a trailing end 19 of the fast slide panel 18 is positioned closest to the trailing jamb 13, the fast slide panel 18 is in position to allow it to pivot 90 degrees without interfering with the pivot motion of the slow slide panel 16. Thus, the distance the pivot axis of each of the slide panels 16, 18 is away from the trailing jamb 13 is a factor that determines the distance of the slide opening 72.

According to an embodiment of the present disclosure, the pivot motion of the sidelite panel 14 to its breakout position is enabled by the swing clear hinge 12. The swing clear hinge 12 is disposed outside of the clear opening 70 and in front of the trailing jamb 13. If a face 76 of the trailing jamb 13 is considered zero and a direction 80 toward the lead jamb 66 is the positive direction 80 and the opposite direction 82 away from the lead jamb 66 is a negative direction 82, then the swing clear hinge 12 is disposed a distance 84 in a negative direction 82 from the face 76 of the trailing jamb 13. By positioning the swing clear hinge 12 a negative distance 78 from the face 76 of the trailing jamb 13, the sidelite panel 14 is allowed to swing substantially clear of the clear opening 70.

The pivot axis 77 of the slow slide panel 16 is disposed a closer distance 79 to the face 76 of the trailing jamb 13 than the distance 81 of the slow slide panel pivot axis 83 (see FIG. 3B) in conventional telescoping door systems, and the pivot motion of the slow slide panel 16 does not interfere with the pivot motion of the sidelite 14. Similarly, the pivot axis 85 of the fast slide panel 18 is disposed a closer distance 87 to the face 76 of the trailing jamb 13 than in a distance 89 of the pivot axis 91 (see FIG. 3B) of conventional telescoping door systems, and the pivot motion of the fast slide panel 18 does not interfere with the pivot motion of the slow slide panel 16.

Figure 3A:
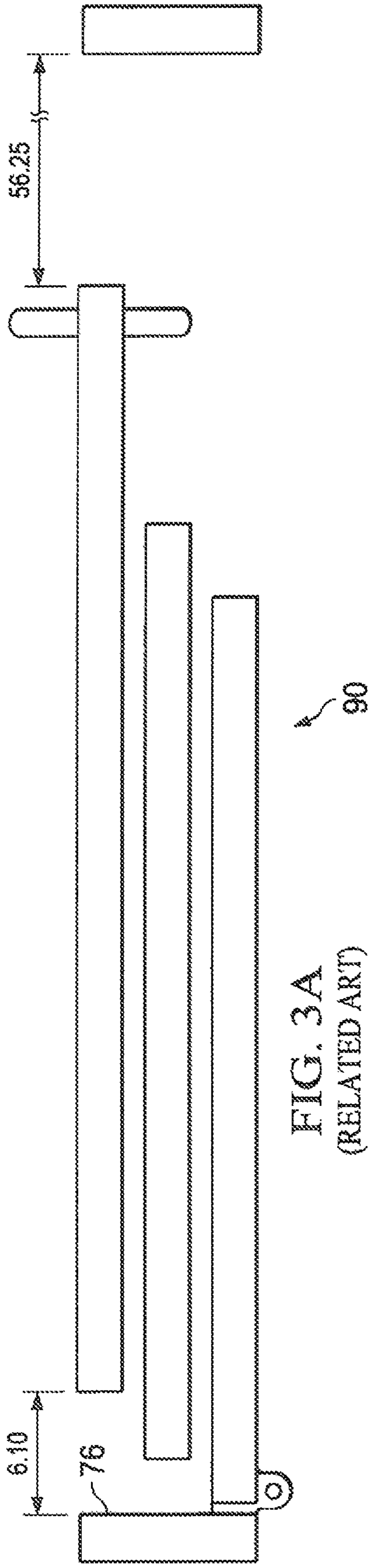
FIG. 3A (RELATED ART)
FIG. 3A is a schematic illustration of a top plan view of a conventional telescoping door system in a fully slid open configuration.
Figure 3B:
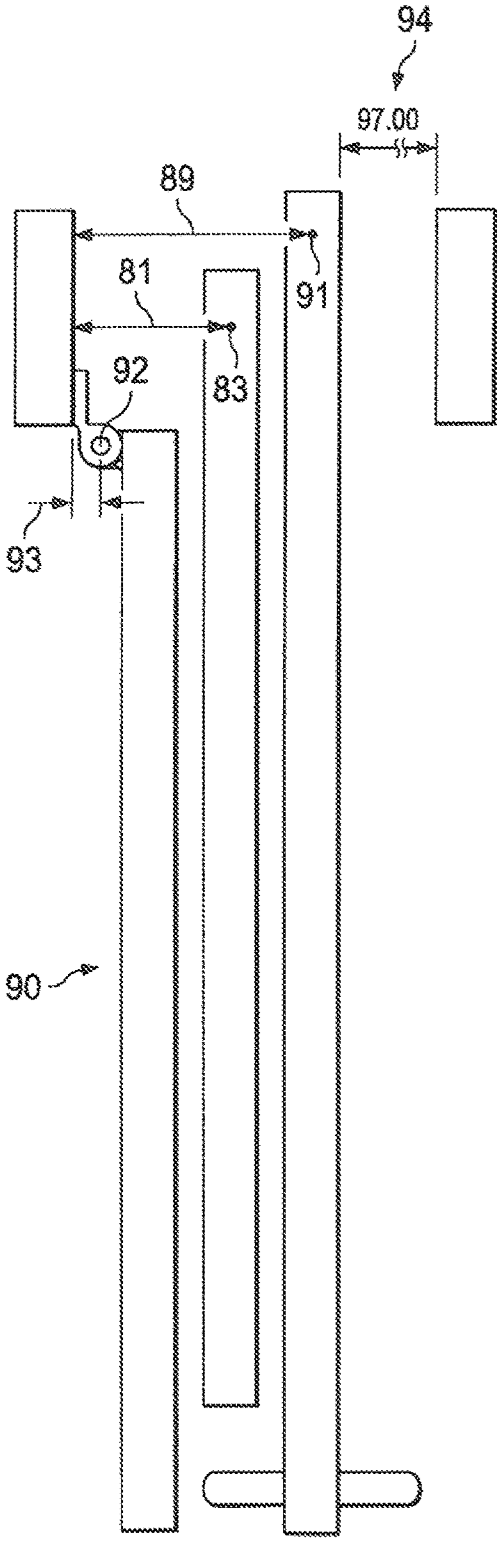
FIG. 3B (RELATED ART)
FIG. 3B is a schematic illustration of a top plan view of a conventional telescoping door system in a breakout configuration.

FIGS. 3A and 3B illustrate the conventional telescoping door system 90 discussed above. In the conventional telescoping door system 90, the pivot axis 92 of the sidelite 14 is disposed within the clear opening 70. Thus, as shown in FIG. 3B, the sidelite panel 14 pivots to a pivot position, but the breakout opening 94 and the slide opening 96 are smaller than the slide opening 72 and the breakout opening 74 of the telescoping door system 10 according to the teachings of the present disclosure. The breakout position of the sidelite panel 14 pivoting on the pivot axis 92 is entirely within the clear opening 70. In contrast, the sidelite 14 is at least partially outside of the clear opening 70 when pivoted to its breakout position. The pivot axes of the slow and fast slide panels of the conventional system 90 are disposed greater distances 81, 89 from the face 76 of the trailing jamb 13 than the distance of the pivot axes 77, 85 of the slow and fast slide panels of the telescoping door system 10 employing the swing clear hinge 12.

Figure 4:
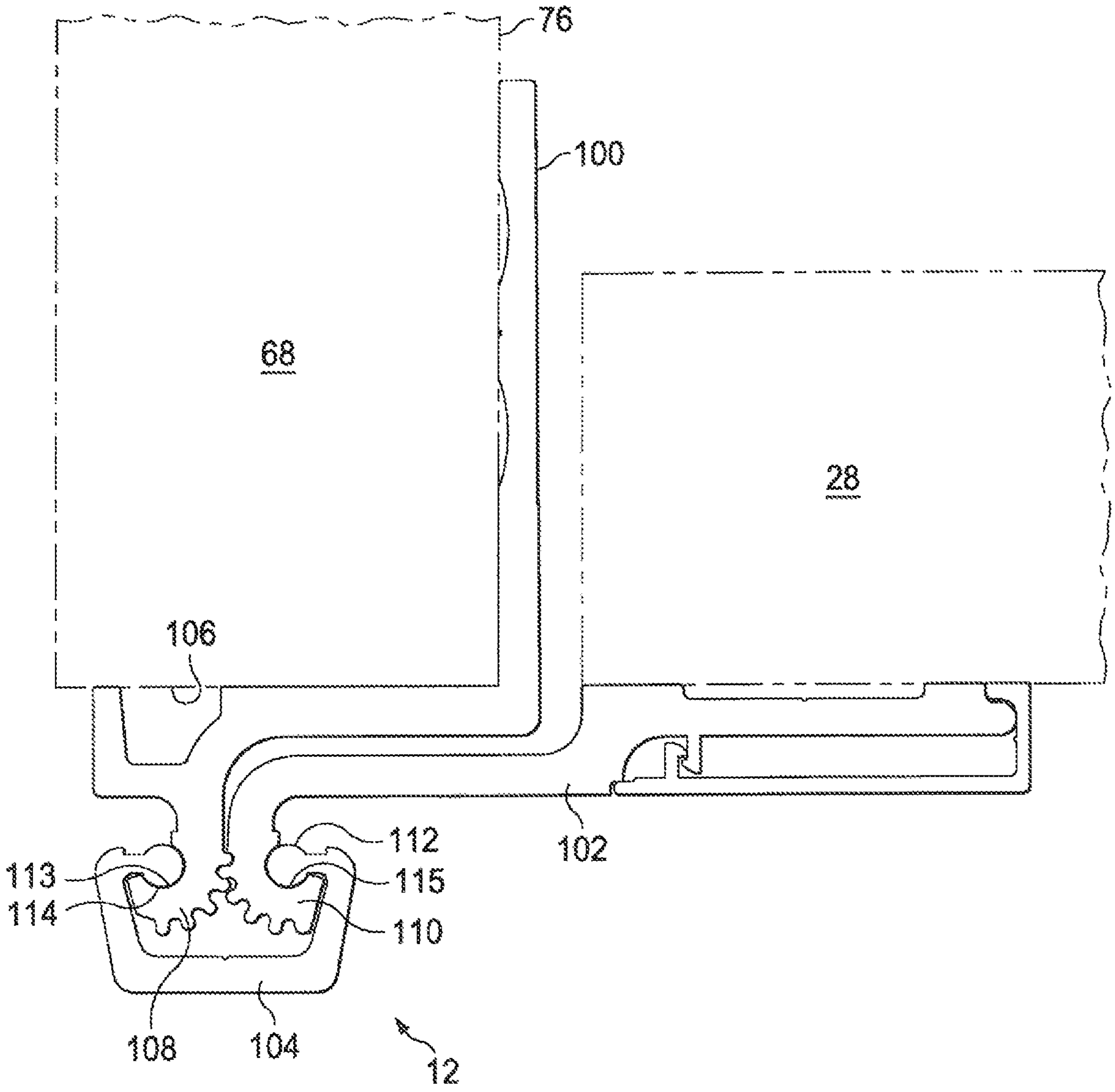
FIG. 4 is a top plan view of a swing clear hinge portion of a telescoping door system according to the teaching of the present disclosure.

The pivot motion of the sidelite 14 is facilitated by the swing clear hinge 12. FIG. 4 is a top plan view of the swing clear hinge 12 attached to the sidelite panel 14 and the trailing door jamb 13. A perspective view of the swing clear hinge 12 is shown in FIG. 1. The swing clear hinge 12 extends substantially the vertical length of the sidelite panel 14. As discussed in more detail below, the swing clear hinge 12, which is associated with the pivot axis of the sidelite panel 14, is positioned in front of the trailing jamb 13 and outside of the clear opening 70. According to one embodiment, the swing clear hinge 12 may be a half surface continuous aluminum geared hinge manufactured by Assa Abloy under the tradename Pemko.

Reference is made to FIG. 4 with continued reference to FIG. 2C. According to one embodiment, the swing clear hinge 12 includes a jamb attachment member 100, a panel attachment member 102, and a gear portion coupler 104. Each of the jamb attachment member 100, the panel attachment member 102, and the gear portion coupler 104 may be aluminum or other suitable material extruded to substantially the vertical length of the sidelite panel 14. According to an alternate embodiment, the swing clear hinge 12 may be two or three separate swing clear hinges positioned spaced apart vertically along the trailing jamb 13 and the trailing rail 28 of the sidelite 14.

The jamb attachment member 100 has a cross section generally in a shape of an "L." An extension of the jamb attachment member 100 is secured to the face 76 of the trailing jamb 13 using any suitable fasteners, such as screws or the like. The jamb attachment member 100 wraps around the trailing jamb 13 and is secured to a pivot-side face 106 of the trailing jamb 13 using screws or other suitable fasteners. An elongated fixed gear portion 108 of the jamb attachment member 100 is disposed in front of the pivot-side face 106 of the trailing jamb 13.

The elongated fixed gear portion 108 of the jamb attachment member 100 is in toothed engagement with an elongated revolving gear portion 110 of the panel attachment member 102. The toothed engagement controls the motion of the two gear portions 108, 110 of the swing clear hinge 12. That is, the toothed engagement of the stationary jamb attachment portion 100 facilitates the rotational motion of the pivotable panel attachment member 102 and the sidelite panel 14.

The gear portion coupler 104 holds the two gear portions 108, 110 in toothed engagement. The hinge coupler has a generally C-shaped cross section. A rod-shaped portion 112 is disposed at each distal end of the "C." The centers of the rod-shaped portions 112, 114 coincide with the axes of rotation for each gear-shaped portion 108, 110. The fixed gear portion 108 includes an arcuate bearing surface 113, and the revolving gear portion 110 includes a revolving arcuate bearing surface 115. The rod-shaped portion 114 contacts the fixed arcuate bearing surface 113, and the rod-shaped portion 112 contacts the revolving arcuate bearing surface 115. This fixed arcuate bearing surface 113 is positioned a distance in a negative direction from the trailing jamb face 76 of the trailing jamb 13 and outside of the clear opening 70. Thus, the sidelite panel 14 pivots to be positioned at least partially in front of the trailing jamb 13, as shown in FIG. 2B, which allows for increased distance of the breakout opening 94 and the slide opening 72.

Returning to FIGS. 2B and 3B, according to certain embodiments, the fixed arcuate bearing surface 113 is a distance 84 of approximately ⅞-1 inch in a negative direction 82. A corresponding distance 93 of the pivot axis 92 of a sidelite of a conventional telescoping door system 90 is approximately ⅞-1 in a positive direction 80 (see FIG. 3B). The pivot axis 77 of the slow slide panel 16 of the door system with the swing clear hinge 12 is also closer to the trailing jamb 13 (see distance 79). The positive distance 87 of the pivot axis 85 of the fast slide panel 18 is approximately 4 inches, which may be approximately 2 inches closer to the trailing jamb 13 than conventional pivoting telescoping doors. Thus, the slide opening 72 can be increased by approximately two inches, and the breakout opening 74 can be increased by approximately 1.5 inches.

As an example, a size of the slide opening 72 is in a range of 60-65 inches, for example, 62.5 inches. According to one embodiment, the size of the breakout opening 74 is increased a range of 0.75-1 inch. As an example, the size of the breakout opening 74 for one embodiment is in a range of 97.5-99.5 inches, for example, 98.6 inches. Increased slide and pivot openings sizes are important to users of telescoping door systems, so even a small increase is significant.

In some embodiments, the door panels 14, 16, and 18 may be guided by an adjacent panel whereby one sliding panel 14, 16, and/or 18 will have a pin 152 (See FIGS. 5 and 6, also referred to herein as a captured post 152) that rides in a track 172 (See FIGS. 15 and 16), mounted at the bottom of an adjacent panel. Once the panels 14, 16, and/or 18 are slid to the fully open position, the panels 14, 16, and 18 can swing to enlarge the clear opening width 70 (See FIG. 2A). In order to do this, the bracket 136 (See FIGS. 5 and 6) that holds the guide pin 152 is a swivel type bracket 136 so that the guide pin 152 can rotate with the panels 14, 16, and 18 are swung open.

Figure 5:
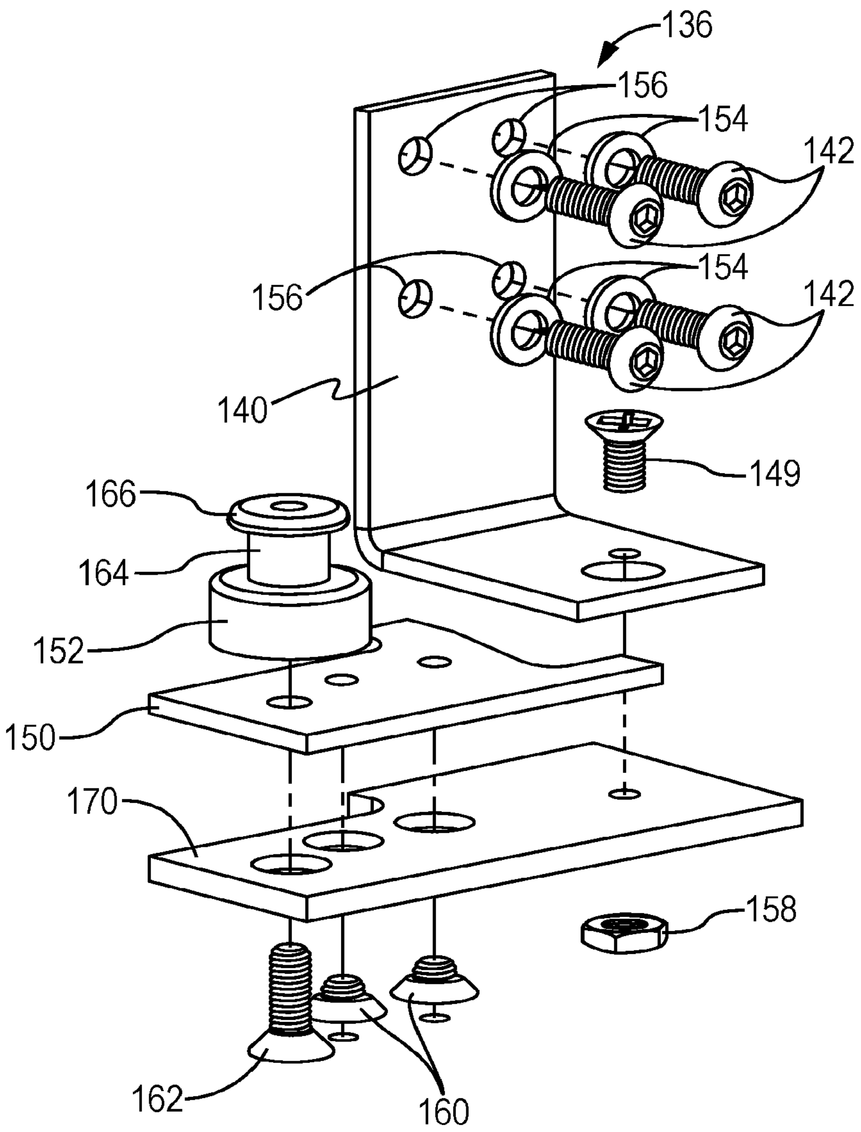
FIG. 5 is an exploded view of a plate assembly.
Figure 6:
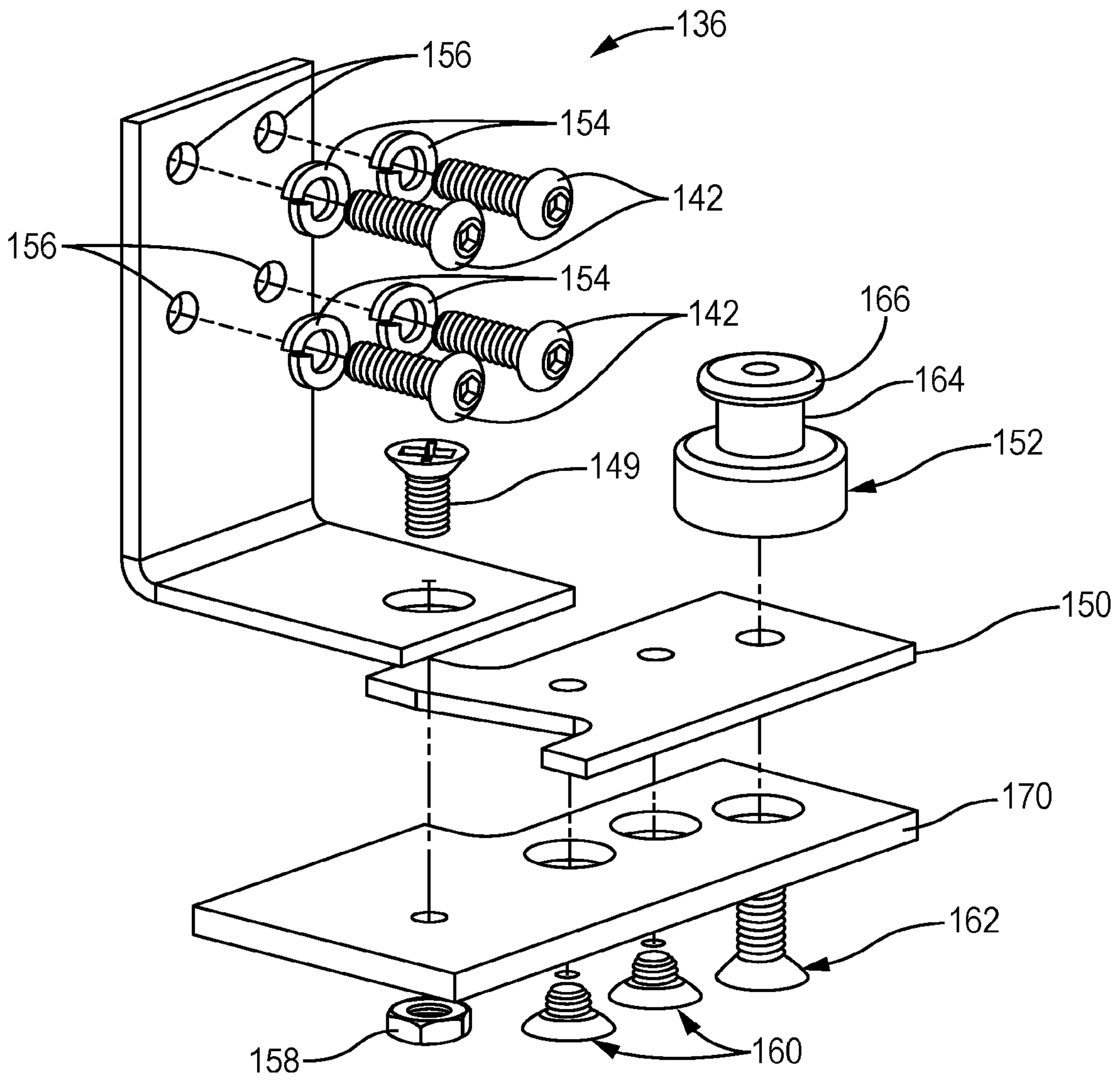
FIG. 6 is an exploded view of a plate assembly.

FIGS. 5 and 6 are exploded views of swivel brackets 136 (also referred to as plate assemblies). FIG. 5 is a left handed swivel bracket 136 where the pin 152 is located on the left side and FIG. 6 is a right handed swivel bracket 136 where the pin 152 is located on the right. It will be understood after reviewing this disclosure, one of ordinary skill in the art will be able to select a right or left hand plate assembly 136 depending on the needs of a particular installation.

The brackets or plate assemblies 136 shown in FIGS. 5 and 6 include an L bracket 140 that attaches to the slow slide panel 16 via fasteners 142 and washers 154 where the fasteners 142 extend through holes 156 in the L bracket 140. Two plates 150, 170 pivot with respect to the L bracket 140. Screws 160 attach the plates 150 and 170 to each other. Screw 162 attaches the two plates 150 and 170 together and also fastens the pin 152 to the upper plate 150. Screw 149 attaches the lower plate 170 to the L bracket 140 with the nut 158.

The screw 149 acts as a pivot shaft to allow the plates 150 and 170 to pivot with respect to the L bracket 140.

The pin 152 has narrow portion 164 and a wider portion 166. The narrow 164 and wider portions 166 of the pin 152 allow the pin 152 to be captured in a track 174 (See FIGS. 15 and 16.

In some embodiments, a problem may develop in that there may be nothing to prevent the swivel bracket 136 from rotating when the panels 14, 16, and 18 are sliding normally. If the swivel bracket 136 rotates when the panels 14, 16, and 18 are sliding normally, the panels 14, 16, and 18 can separate during a sliding operation. The separation of the panels 14, 16, and 18 during a sliding operation may, in some instances, be undesirable.

Figure 12:
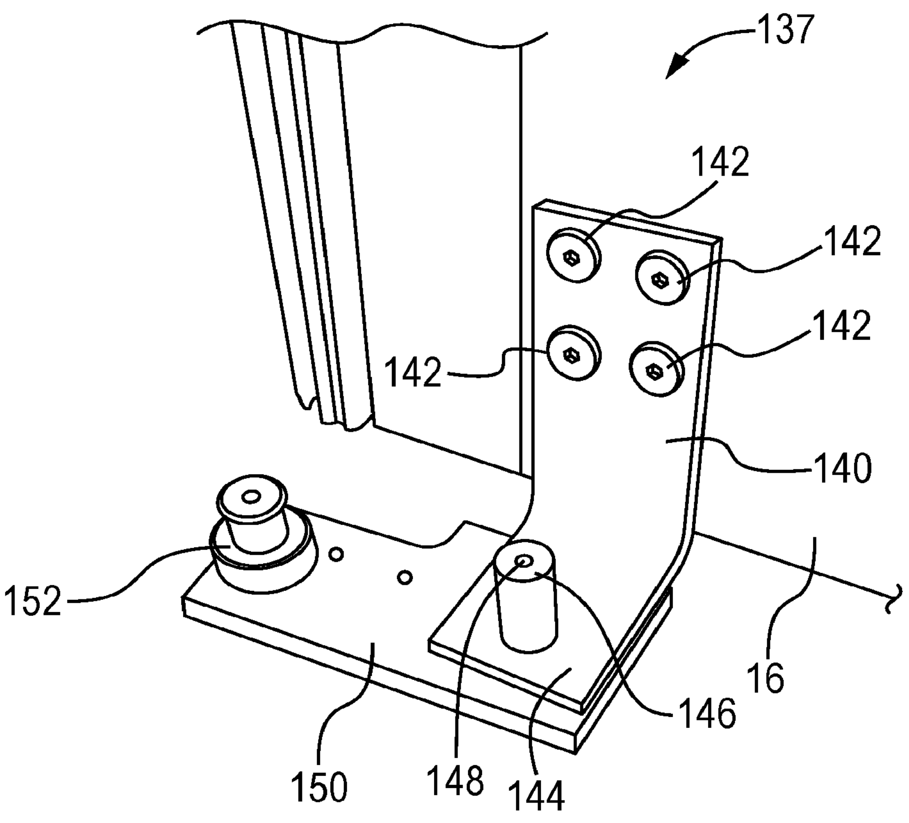
FIG. 12 is a perspective view of a retaining pin plate in accordance with the present disclosure.
Figure 13:
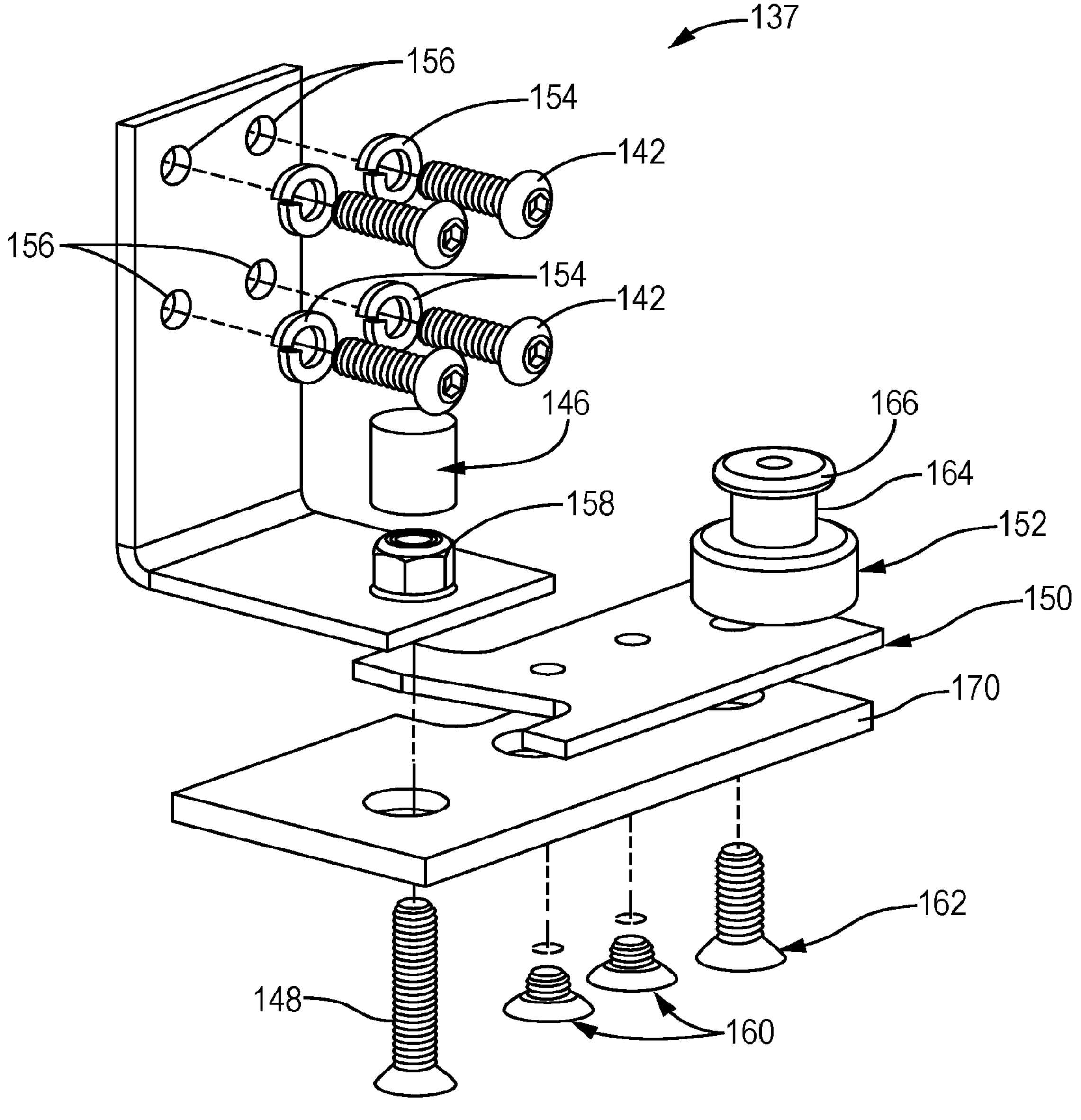
FIG. 13 is an exploded view of a retaining pin plate in accordance with the present disclosure.
Figure 14:
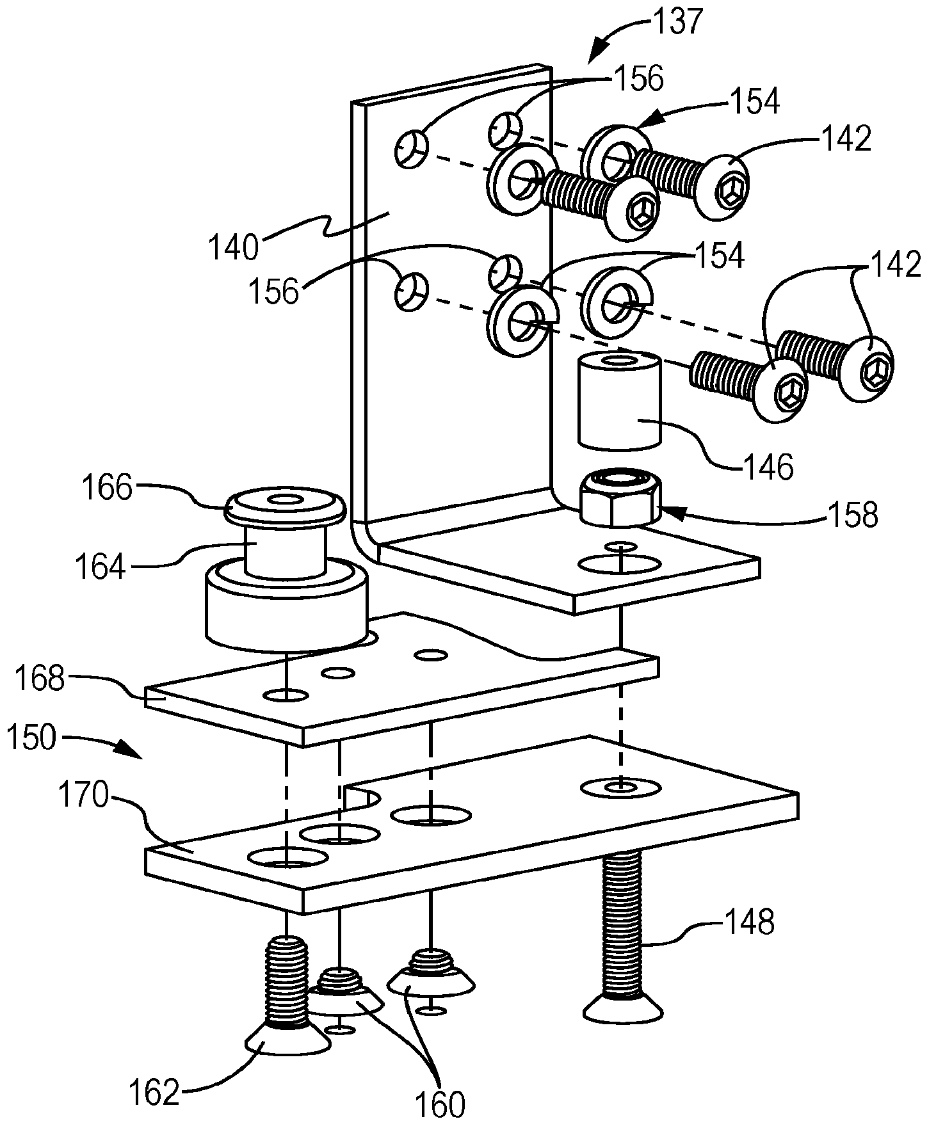
FIG. 14 is an exploded view of a retaining pin plate in a different configuration to the retaining pin plate shown in FIG. 13.

To address the feature of panel 14, 16, and 18, separation during sliding, in some embodiments, a second pin (also referred to herein as a rigid post 148 and resilient sleeve 146, See FIGS. 13 and 14) is used in the guide bracket assembly 137. The second pin 146, 148 travels in a track 173 (See FIGS. 15 and 16) to prevent the bracket 136 from rotating during sliding of the panels 14, 16, and 18. Once the panels 14, 16, and 18 are fully open, a notch 176 (see FIGS. 15 and 16) in the bottom rail 56 of the side panel 18 will allow the second pin 146, 148 to swing out of the panel 18 and allow the panel 18 to rotate. Embodiments having a guide bracket assembly 136 with the second pin are shown in FIGS. 7-18 and described below.

Figure 7:
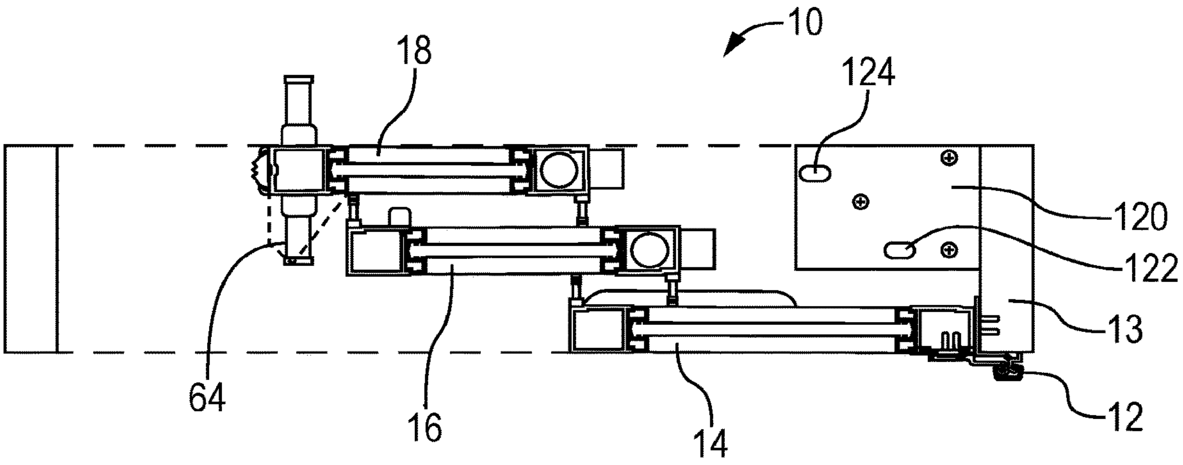
FIG. 7 is a top view of a door system in accordance with the present disclosure.
Figure 8:
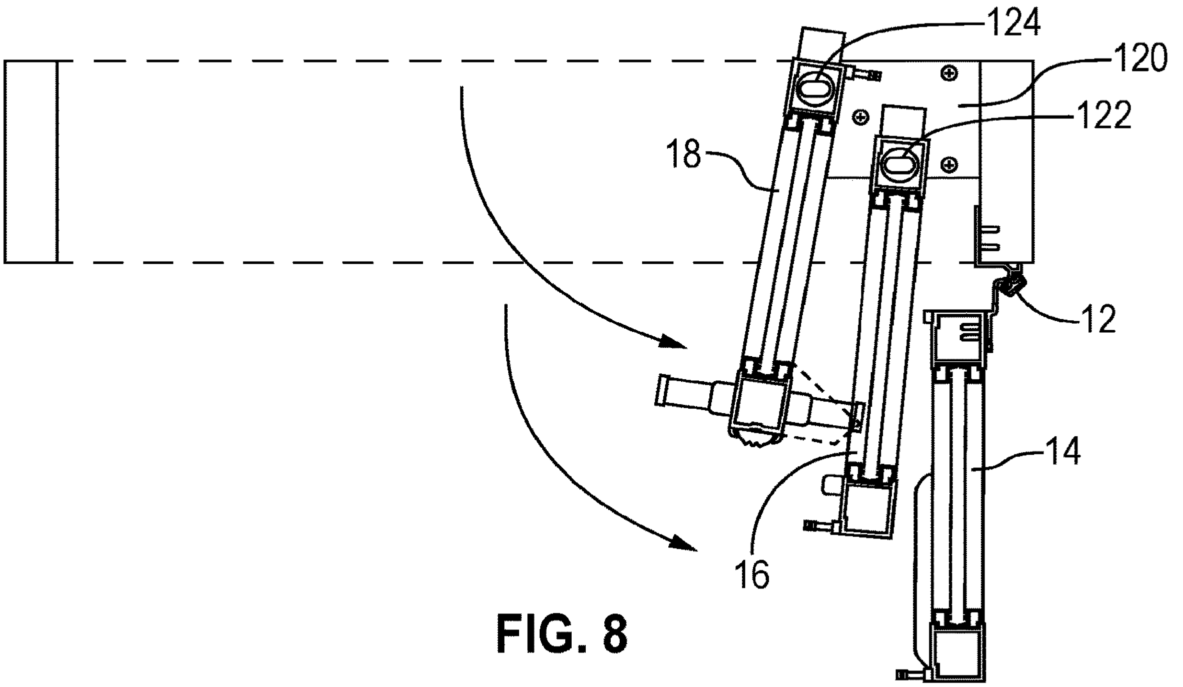
FIG. 8 is a top view of a door system in a partially broken out position in accordance with the present disclosure.
Figure 9:
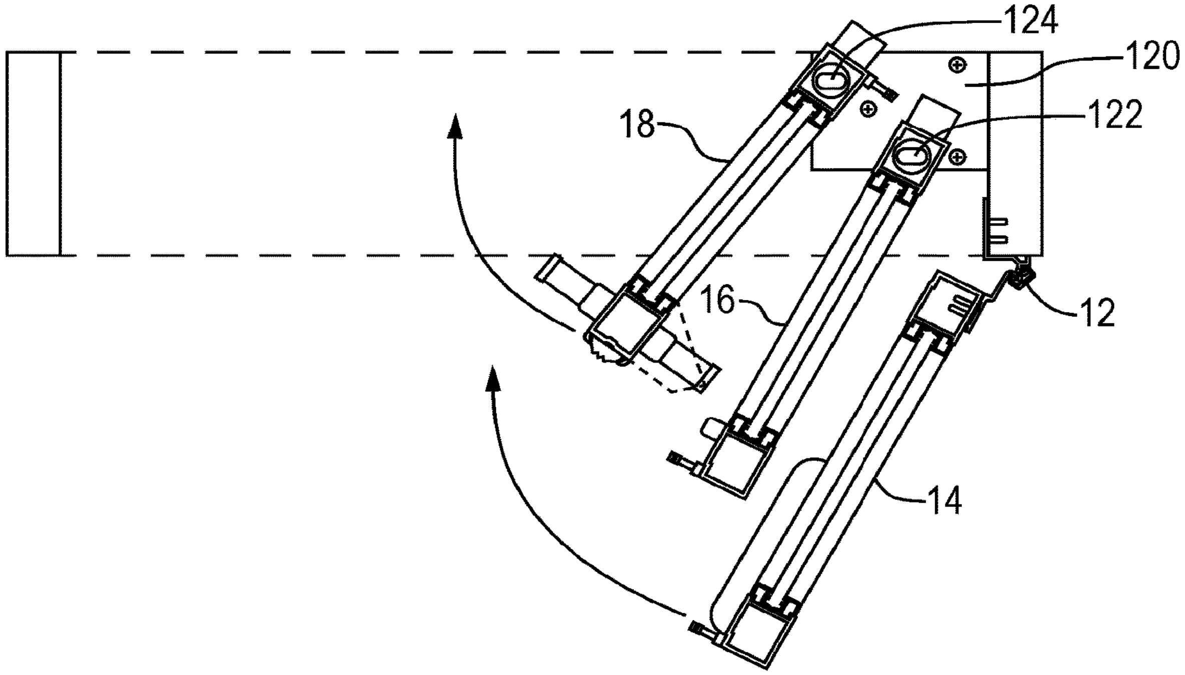
FIG. 9 is a top view of a door system in a partially broken out position in accordance with the present disclosure.
Figure 10:
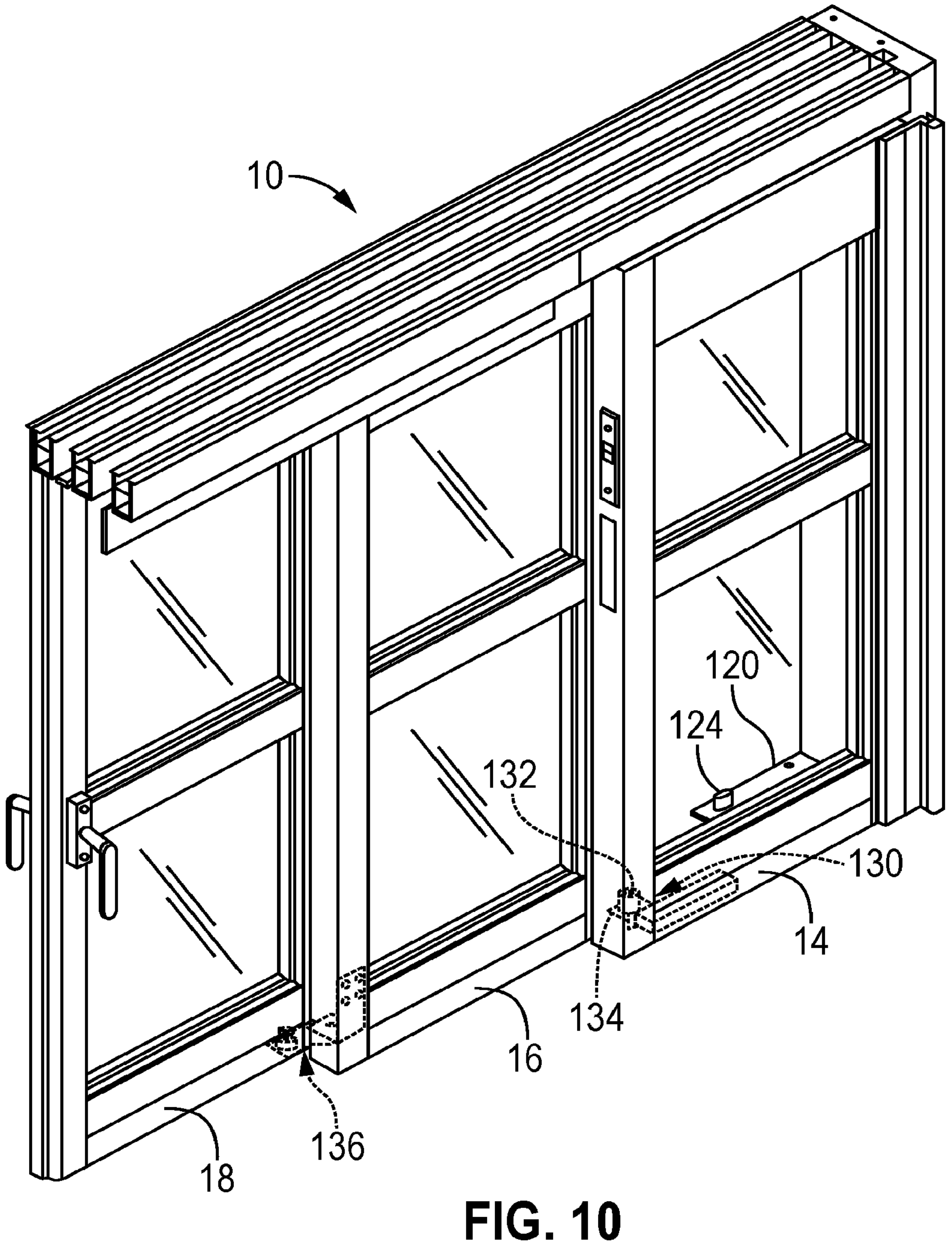
FIG. 10 is a perspective view of a door system in a closed position in accordance with the present disclosure.

FIGS. 7, 8, and 9 show the door system 10 with the panels 14, 16 and 18. The handle 64 is shown attached to the panel 18. The floor plate 120 is shown near the trailing jamb 13 with the slow side and fast side pivot pins 122 and 124 not engaged with the panels 16 and 18 in FIG. 7. When the panels 16, and 18 are engaged with the pivot base plate 120, the side light panel 14 may be rotated about the hinge 12 and the slow and fast panels 16 and 18 rotated on the slow slide pin 122 and the fast slide pin 124 to a break out position as shown in FIGS. 8 and 9.

In some instances, when the door system 10 moves to the breakout position, the panels 14, 16, and 18 may unevenly separate from each other as shown in FIG. 9. To keep the panels 14, 16, and 18 together, the door system 10 may be equipped with a plate system 130 (See FIG. 10) which includes a plate 132 and post 134 on the side light panel 14 for engaging the slow slide panel 16 and pivoting plate assembly 137 on the slow slide panel 16 for engaging the fast slide panel 18.

Figure 11:
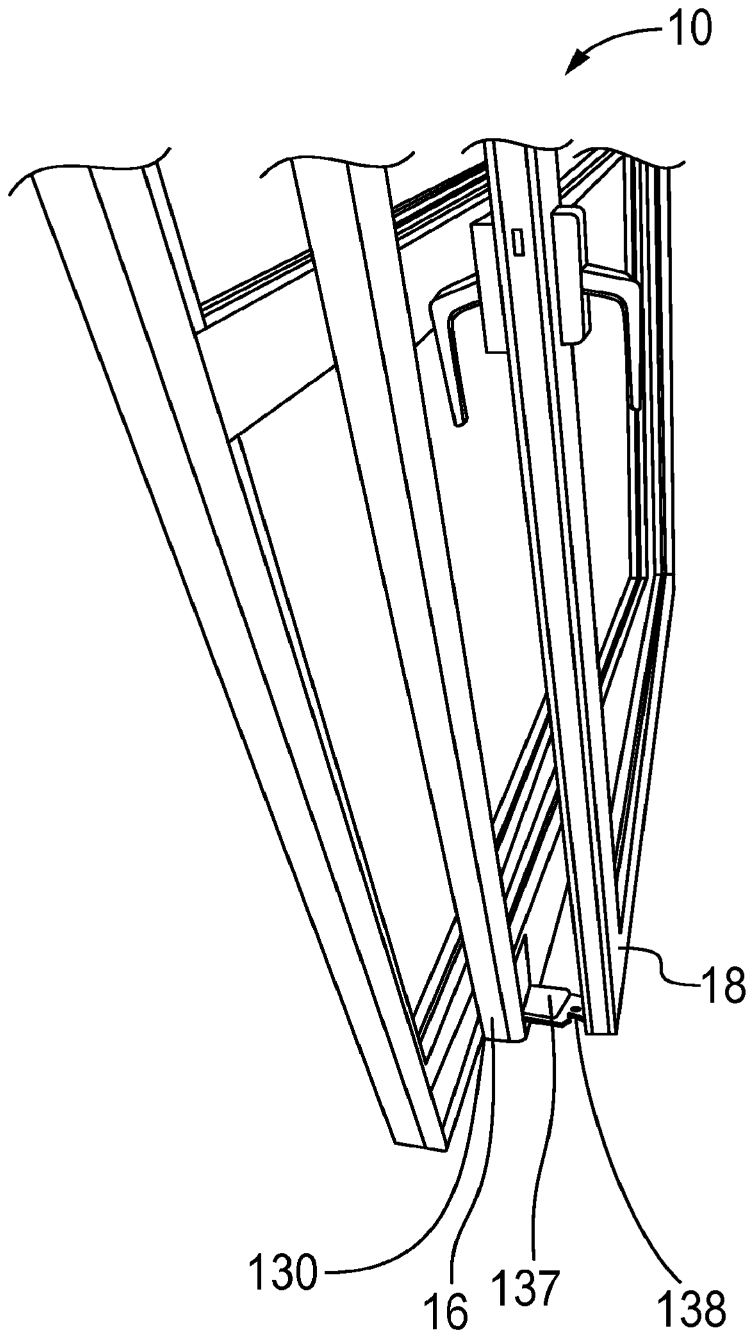
FIG. 11 is a perspective view of a door system in an opened position in accordance with the present disclosure.

FIG. 11 shows plate assembly 130 engaged with the slow slide panel 16 and the pivoting plate assembly 137 attached to the slow slide panel 16 and engaged with the fast slide panel 18.

FIGS. 12, 13, and 14 show the pivoting plate assembly 137. FIG. 13 had a different configuration than that shown in FIGS. 12 and 14 which may be useful in some applications. FIGS. 13 and 14 can be consider "left" and "right" hand versions. The pivoting plate assembly 137 has an L bracket 140 that attaches to the slow slide panel 16 via fasteners 142 and washers 154 where the fasteners 142 extend through holes 156 in the L bracket 140. Two plates 150, 170 pivot with respect to the L bracket 140. Screws 160 attach the plates 150 and 170 to each other. Screw 162 attaches the two plates 150 and 170 together and also fastens the pin 152 to the upper plate 150. Screw 148 attaches the lower plate 170 to the L bracket 140 with the nut 158. The screw 148 is capped with a cap or resilient sleeve (in some embodiments nylon) 146 to allow the cap 146 to act as a pin. The screw 148 acts as a pivot shaft to allow the plates 150 and 170 to pivot with respect to the L bracket 140.

The pin 152 has narrow portion 164 and a wider portion 166. The narrow 164 and wider portions 166 of the pin 152 allow the pin 152 to be captured in a track 174 (See FIGS. 15 and 16. It will be appreciated that the pin 146 is more cylindrical in shape.

Figure 15:
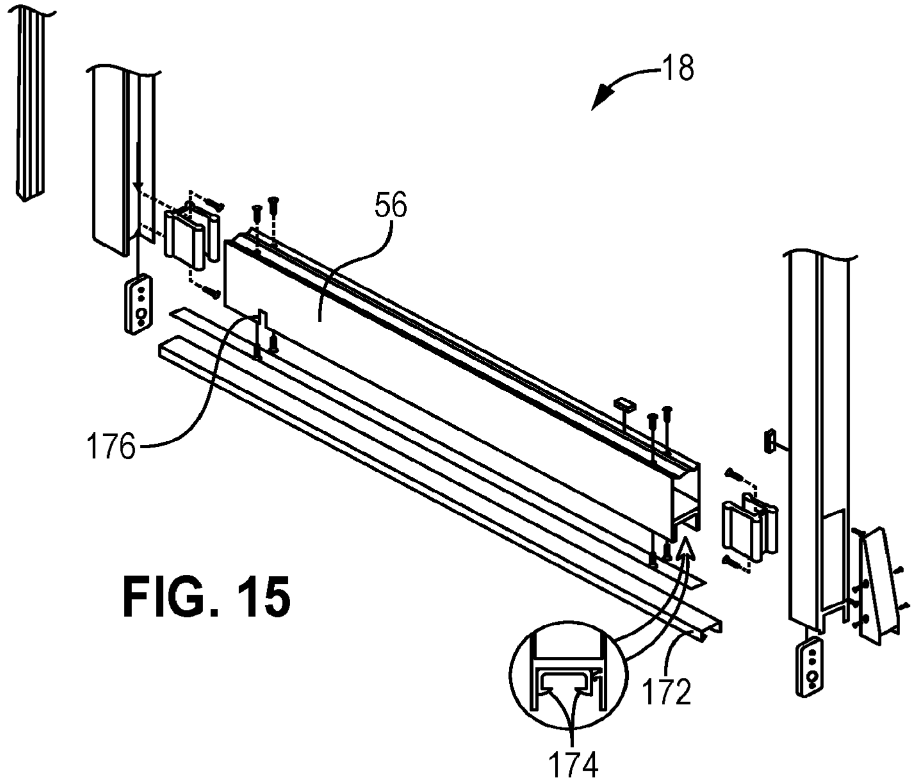
FIG. 15 is an exploded view of a bottom rail of a door panel in accordance with the present disclosure.
Figure 16:
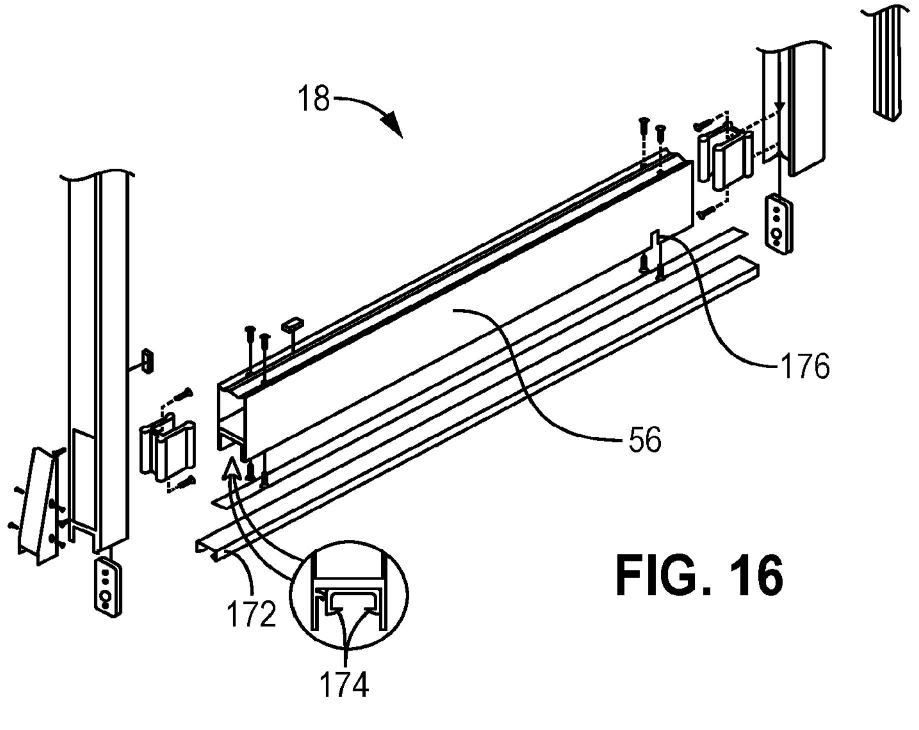
FIG. 16 is an exploded view of a bottom rail of a door panel of the opposite side shown in FIG. 15.

FIGS. 15 and 16 show the bottom rail 56 of the fast slide panel 18. A track 172 is fit into the bottom rail 56 of the fast slide panel 18. The track 172 has projections 174 that fit into the narrow portion 164 of the pin 152. (See FIGS. 12-14). The projections 174 capture the pin 152 within the track 172 while still allowing the pin 152 to slide lengthwise along the track 172. The pin 146 also slides along the track 172, but it is not retained in the same manner as pin 152 where the projections 174 capture the pin 152 in the track 172. When the door system 10 is opening and closing by sliding as shown in FIGS. 1 and 7 the pin 152 slides along the track 172 and helps maintain the panel 18 in a proper orientation with respect to panel 16.

Typically, both the pin 146 and the pin 152 are located in the same track 174 at the same time. When the door panel 18 needs to pivot to a breakout position, the pin 146 leaves the track 174 to facilitate the pivoting of the panel 18. In order to leave the track 174, a relief opening 176 is located in the bottom rail 56 of the panel 18. FIGS. 15 and 16 show opposite sides of the bottom rail 56 for the panel 18 and show the relief hole 176.

Figure 17:
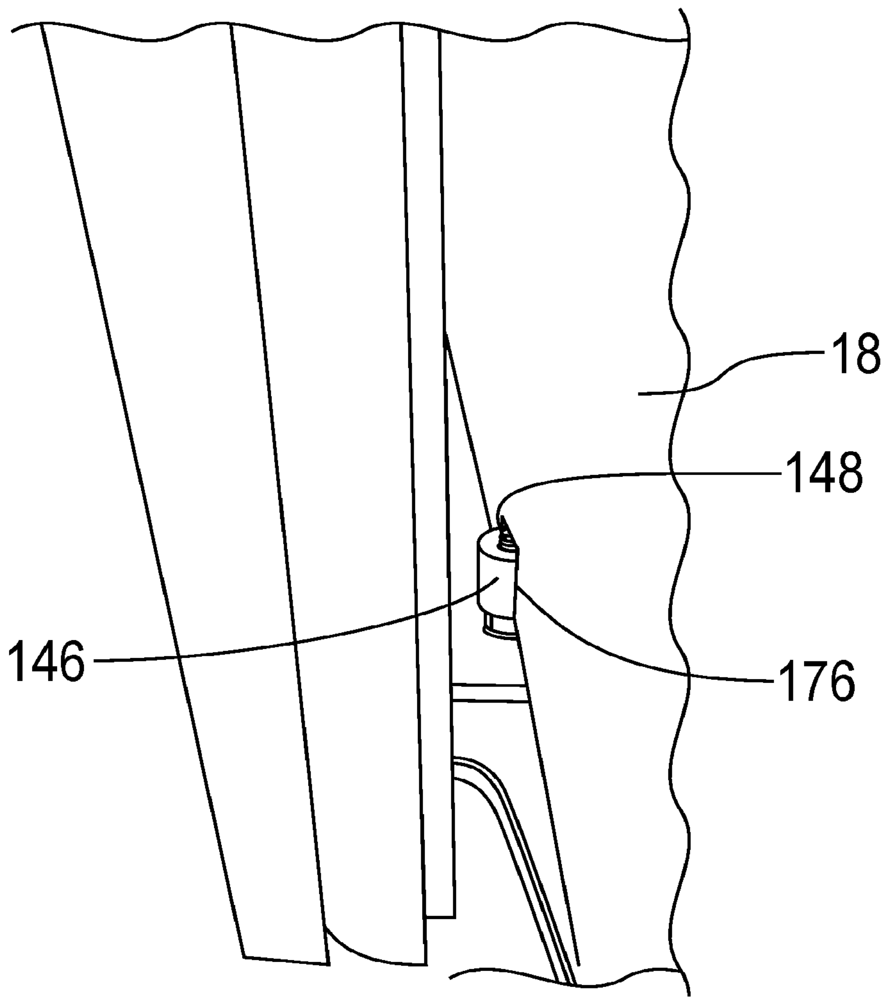
FIG. 17 is a perspective view of a pin in a pin opening in a door panel in accordance with the present disclosure.
Figure 18:
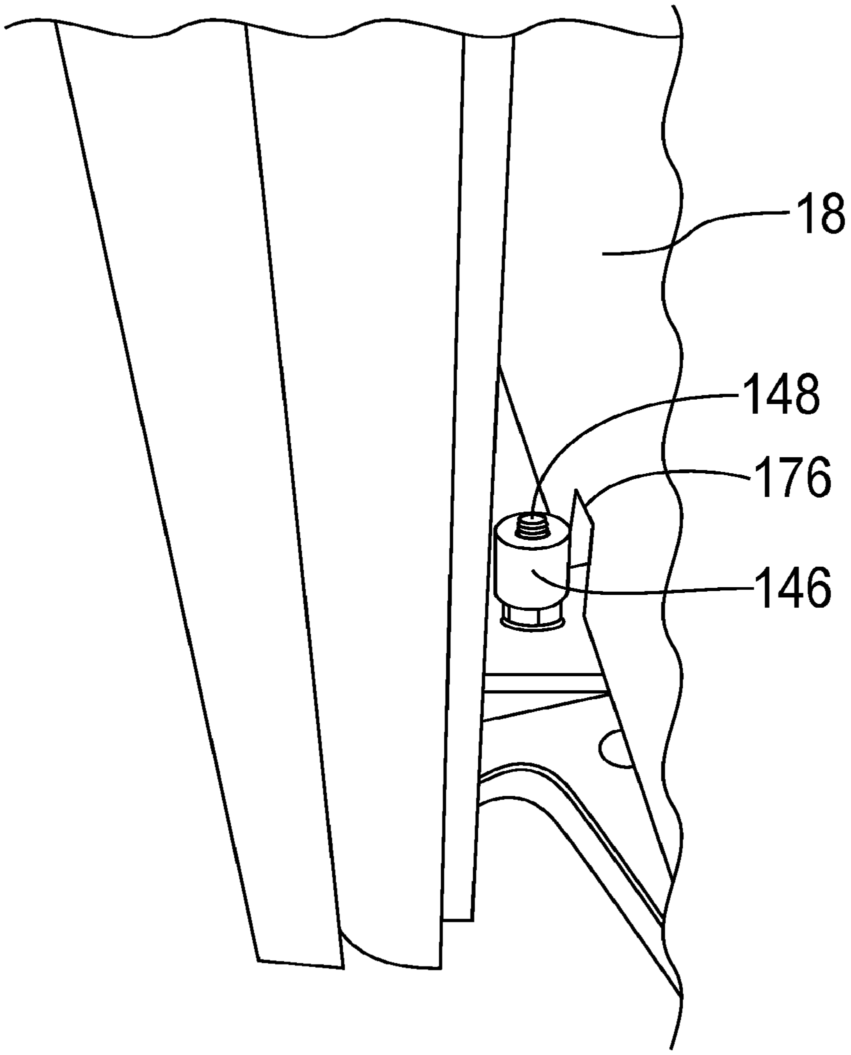
FIG. 18 is a perspective view of a pin exiting a pin opening in a door panel in accordance with the present disclosure.

FIGS. 17 and 18 show the pin 146 and rigid post 146 moving out of the pin opening 176 in the first slide panel 18. Once the pin 146 and rigid post 146 have moved out of the opening 176 the first slide panel 18 is free to pivot to a breakout position.

Although preferred embodiments of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims.

What is claimed is:

1. A door system, comprising:

a track spanning across a doorway defined by a trailing jamb and an opposing lead jamb, the trailing jamb including a jamb face oriented facing in a first direction toward the lead jamb;

a sidelite panel coupled to the trailing jamb by at least one swing clear hinge, the at least one swing clear hinge comprising a fixed portion engaged with a revolving portion, the fixed portion being at least partially offset from the jamb face in a second direction opposite the first direction and secured to the trailing jamb by a jamb attachment member secured to the jamb face;

a first slide panel operable to move linearly within the track; and a second slide panel operable to move linearly within the track, the first and second slide panels having an open configuration when positioned in the track, the revolving portion being at least partially offset from the jamb face in the second direction in the open configuration, wherein the sidelite panel, the first slide panel, and the second slide panel are configured to pivot out of the track into a breakout configuration, the sidelite panel configured to be at least partially offset from the jamb face in the second direction when rotated 90 degrees from the open configuration to the breakout configuration.

2. The door system of claim 1, wherein the fixed portion is at least partially disposed along a side face of the trailing jamb.

3. The door system of claim 1, wherein the at least one swing clear hinge comprises the jamb attachment member attached to the trailing jamb and a panel attachment member attached to the sidelite panel.

4. The door system of claim 3, wherein the jamb attachment member includes the fixed portion and the panel attachment member includes the revolving portion.

5. The door system of claim 4, wherein the at least one swing clear hinge further comprises a coupler, the coupler maintaining engagement of the fixed portion with the revolving portion.

6. The door system of claim 5, wherein the coupler comprises a pair of rod portions.

7. The door system of claim 1, wherein the at least one swing clear hinge comprises a plurality of swing clear hinges coupled to the trailing jamb and vertically aligned with each other.

8. The door system of claim 1, further comprising a handle disposed at a lead end of the second slide panel.

9. The door system of claim 1, further comprising a positive latch disposed at a lead end of the second slide panel.

10. The door system of claim 1, wherein the at least one swing clear hinge extends along a majority of a height of the sidelite panel.

11. A door system, comprising:

a track spanning across a doorway having a clear opening defined by a trailing jamb and a lead jamb, the trailing jamb including a jamb face facing the lead jamb;

a sidelite panel coupled to the trailing jamb by at least one swing clear hinge, the at least one swing clear hinge comprising a fixed portion and a revolving portion, the fixed portion being at least partially offset away from the lead jamb with regard to the jamb face and secured to the trailing jamb by an L-shaped bracket, the L-shaped bracket comprising a first portion configured to extend along the jamb face and a second portion configured to extend along a pivot-side face, the fixed portion extending from the second portion at a position at least partially offset from the jamb face away from the lead jamb; and a slide panel operable to move along the track, the slide panel having an open configuration when positioned in the track, the revolving portion being at least partially offset away from the lead jamb with regard to the jamb face when the slide panel is in the open configuration, wherein the sidelite panel and the slide panel are configured to pivot out of the track into a breakout configuration.

12. The door system of claim 11, wherein in the breakout configuration a trailing edge of the sidelite panel is disposed at least partially outside the clear opening and along a side face of the trailing jamb.

13. The door system of claim 11, wherein the at least one swing clear hinge comprises a jamb attachment member attached to the trailing jamb and a panel attachment member attached to the sidelite panel.

14. The door system of claim 13, wherein the jamb attachment member includes the fixed portion and the panel attachment member includes the revolving portion.

15. The door system of claim 14, wherein the at least one swing clear hinge further comprises a coupler maintaining engagement of the fixed portion with the revolving portion.

16. The door system of claim 15, wherein the coupler comprises a pair of rod portions.

17. A swing clear hinge, comprising:

a fixed portion extending from a jamb attachment member configured to be secured to a jamb of a doorway such that the fixed portion is offset in a first direction transverse to a jamb face of the jamb, the jamb face extending transverse to a clear opening of the doorway; and a revolving portion extending from a panel attachment member configured to be secured to a panel of a door, the revolving portion being offset in the first direction from the jamb face when the door is in a closed configuration with the panel attachment member extending in the first direction and in an opposing second direction with respect to the jamb face, wherein the revolving portion is configured to rotate with respect to the fixed portion to transition the door into a breakout configuration, wherein an axis of rotation of the revolving portion moves continuously as the door is transitioned into the breakout configuration.

18. The swing clear hinge of claim 17, wherein the jamb attachment member includes a first portion configured to extend along the jamb face, with the jamb disposed on a first side of the first portion, and a second portion configured to extend along a side face of the jamb, the first and second portions forming an L-shape.

19. The swing clear hinge of claim 18, wherein the fixed portion and the revolving portion are disposed entirely on the first side of the first portion of the jamb attachment member in both the closed and breakout configurations.

20. The swing clear hinge of claim 18, wherein the panel attachment member extends parallel to the second portion of the jamb attachment member and is configured to attach to a side surface of the panel extending parallel to the clear opening.

* * * * *